March 7, 1961  A. W. PECK  2,973,729
LIQUID-AMMONIA FLOW CONTROL SYSTEM
Filed Dec. 11, 1958
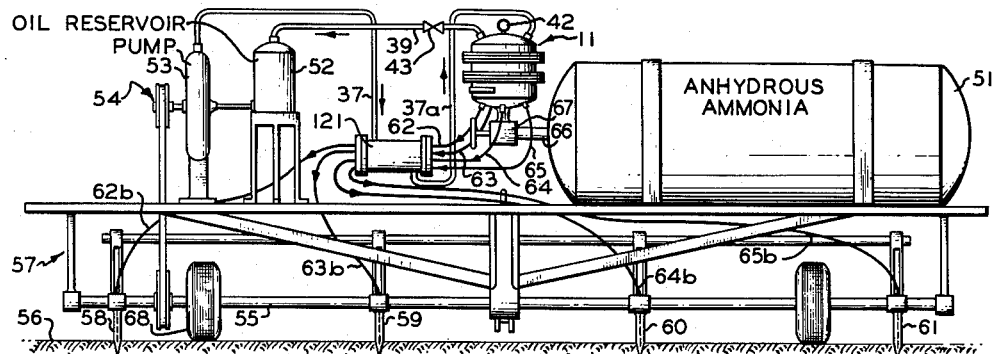
FIG. 1
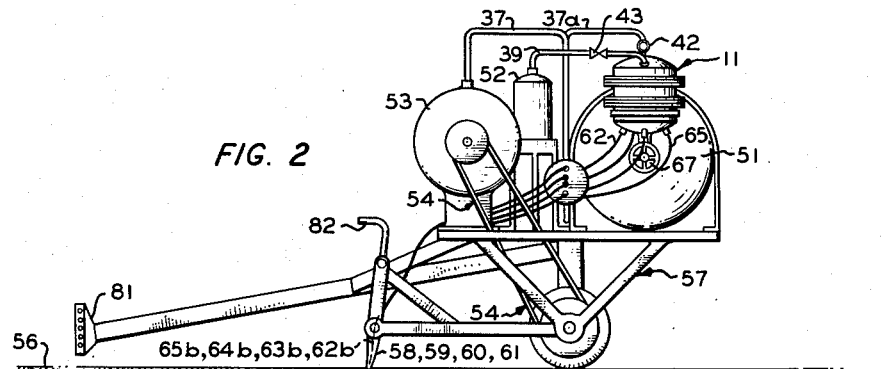
FIG. 2
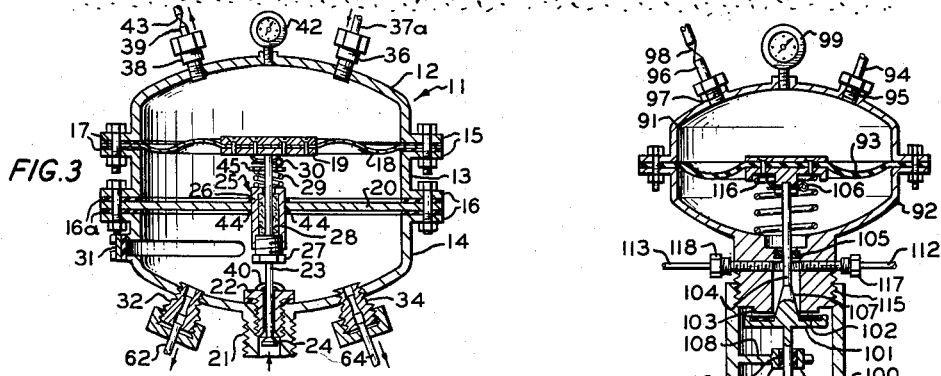
FIG. 3
FIG. 4
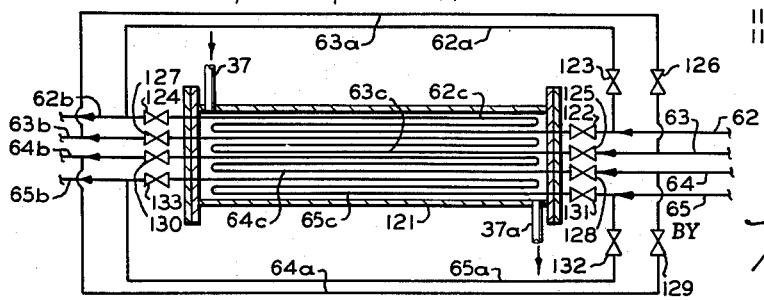
FIG. 5
INVENTOR.
A.W. PECK
BY
ATTORNEYS

2,973,729
LIQUID-AMMONIA FLOW CONTROL SYSTEM

Alvin W. Peck, Bartlesville, Okla., assignor to Phillips Petroleum Company, a corporation of Delaware Filed Dec. 11, 1958, Ser. No. 779,753
7 Claims. (Cl. 111—7)

This invention relates to an apparatus for injecting fertilizer ammonia into soil. In one aspect it relates to apparatus for accurately regulating the flow of ammonia into soil.

In tractor-mounted liquid fertilizer distributing equipment where the controls are in reach of the operator, the operator may cut off the flow of liquid fertilizer at the instant the tractor is stopped so that there will not be a continued flow of liquid with its resultant loss and overdosage. In large fertilizer distributing assemblies wherein the fertilizer distributor is a tractor drawn assembly, the tractor operator, upon bringing the tractor to a halt, must dismount from the tractor and walk to the distributor apparatus and turn a valve in order to stop the flow of liquid fertilizer. During this time interval liquid fertilizer is continuing to flow and to be injected into the ground at one point by each separate injector nozzle. The fertilizer which flows during this interval of time is of course, a loss. And, further, the continued injection of fertilizer into the ground while the apparatus is not moving overfertilizes the soil at this point or points with the result that many crops in the immediate vicinity of the overinjections will be burned.

One object of this invention is to provide an apparatus which is adaptable to stop the flow of fertilizer simultaneously with the halting of the apparatus.

Another object of this invention is to provide an apparatus for the prevention of loss of liquid fertilizer during the starting and stopping operations.

Another object of this invention is to provide an automatic fertilizer distributing apparatus which prevents overinjections of liquid fertilizer into the soil during periods of starting and stopping of the apparatus.

Another object of this invention is to provide an apparatus for accurately regulating the flow of ammonia into the soil.

Other objects and advantages will be realized upon reading the following description which, with the attached drawing, respectively described and illustrates preferred embodiments of my invention.

Figure 1 is an elevational view of a 4-row liquid fertilizer distributor assembly mounted on a 2-wheel vehicle.

Figure 2 is a side view of the apparatus of Figure 1.

Figure 3 is an elevational view, partly in section, of a portion of the apparatus of Figure 1.

Figure 4 is a sectional view of another embodiment of flow controller.

Figure 5 is a longitudinal view, partly in section, of a portion of the apparatus of Figure 1.

This invention is an improvement over my invention disclosed and claimed in Patent 2,691,358, issued October 12, 1954.

It has now been discovered that the viscosity of the hydraulic fluid used to operate the distributor valve is subject to change during continued operation of the above-mentioned apparatus, because the hydraulic fluid becomes heated during its passage through its pump and pressure regulating needle valve. As the viscosity changes, the flow rate through the needle valve changes, and thus the present ammonia application rate "drifts."

In order to alleviate this problem I pass at least a portion of the ammonia from the metering device in indirect heat exchange with the hydraulic fluid to cool this fluid. The metering device is so designed as to split the total ammonia fed to it into several equal streams, which, in turn, are passed to their respective injection nozzles. By the practice of this invention, one or more of these streams is passed from the metering device into a small indirect heat exchanger, which is preferably constructed to allow at least a portion of each ammonia stream to vaporize. The hydraulic fluid in heat exchange with this ammonia is thus cooled and is held at a constant cool temperature, thereby preventing irregular heating of the ammonia in the distributor. Such operation permits more uniform distribution of the ammonia to the injection nozzles.

It may be further mentioned that, as discussed in the above-identified patent, it is preferable to prevent free access of ammonia to the underside of the diaphragm in the metering device. The reason for this is that the hydraulic fluid after becoming heated by use of the distributing equipment would transfer heat rapidly through the diaphragm to the ammonia in the metering device, thus causing the ammonia to boil. Ammonia boiling within the metering device body is objectionable, since obviously less weight of ammonia per unit time can pass through the metering nozzles coupled with irregular distribution when gas and liquid phases are both present. Drifting and irregularity of injection rate of the ammonia as the hydraulic fluid becomes heated during use are eliminated by the practice of this invention, since the hydraulic fluid is held at a low and constant temperature. Further, by means of this invention, the ratio of liquid to gas in the metering device effluent is higher because of the lower temperature.

The amount of metered ammonia which is to be passed in indirect heat exchange with the hydraulic fluid is readily determined by one skilled in this field. Although it is preferred to cool the hydraulic fluid just prior to its entry into the metering device, it may be cooled at other locations in the circuit.

Referring now to the drawing, and specifically to Figure 3, the distributor flow controller 11 is broadly a cylindrical vessel containing three compartments. The upper compartment is bounded by a housing or shell 12, and a diaphragm 18. The lower compartment is bounded by a shell 14 and a rigid partition plate 20. The center compartment is bounded by a ring 13, the diaphragm 18 and the partition plate 20. The housing 12 and the ring 13 are held together by bolted flanges 15. Within this joint is disposed the diaphragm 18. On either side of the diaphragm 18 are disposed gaskets 17 so as to make the upper and center compartments fluid tight. This upper compartment is provided with a pressure gauge 42 and two pipe connections 36 and 38. To the connection 36 is attached a tube or pipe 37a while tube 39 is attached to the connection 38. Tube 39 is provided with a needle valve 43. The lower section 14 of this vessel is attached to the ring 13 by the bolted flanges 16. Between these flanges 16 is mounted the rigid partition plate 20 carrying gaskets 16a so that the bolted flanges 16 provide fluid tight connections with the plate 20. In the bottom of this lower section 14 is provided a valved pipe connection 21. On the inside of this pipe connection 21 is a bushing 22 which serves as a seat for a valve 24. The stem 23 of this valve 24 extends upward through a packing gland assembly 25 and terminates in substantial contact with a diaphragm plate 19 of the diaphragm 18. This packing gland assembly 25 is composed of a shell 26, packing 28 and a take-up nut 27. A bolted plate 31 is provided around a portion of the periphery of element 14 to provide access for adjustment of the take-up nut 27 and bushing 22. The packing shell 26 is attached rigidly to the partition plate 20 by welds 44 in such a manner that the joint between the shell 26 and the plate 20 is fluid-tight. At the upper end of the valve stem 23 is a key 30 inserted through the end of the valve stem 23. Immediately under this key 30 is a washer 45 to hold a compression spring 29 on the top of shell 26. This compression spring tends to bias the valve head 24 in a closed position when no downward pressure is being exerted on diaphragm 18. This diaphragm 18 and diaphragm plate 19 are intended to operate so that when fluid pressure is exerted in housing 12 the diaphragm and plate will be moved slightly in a downward direction against the end of the valve stem 23 to cause the valve head 24 to open.

Tube 37a is an oil inlet tube for the introduction of oil under pressure into the space above the diaphragm 18. Tube 39 is for the flow of oil from this space. The needle valve 43 is for adjustment or restriction of the flow of oil through tube 39 so as to maintain a given or predetermined oil pressure in this upper compartment in order to open valve 24. Tubes 62 and 64 are fertilizer distributor tubes for carrying liquid fertilizer from this distributing controller to a heat exchanger 121. Opening 40 and a similar opening in the cutaway half of Figure 3 are additional openings for insertion of tube connections similar to connections 32 and 34 for attachment of tubes 63 and 65, respectively, for passage of ammonia to heat exchanger 121. These connections are preferably metering elements and they are so chosen that the diameters of the conduits therethrough permit the desired rate of flow of ammonia. In case soil is being fertilized which is quite deficient in nitrogen, connections 32 and 34 should contain metering orifices of larger diameter than when soil to be fertilized requires less nitrogen and needs only a slight fertilizer treatment.

This distributing flow controller assembly is intended to operate in such a manner that when the vehicle upon which it is mounted starts to move, oil enters the upper chamber through tube 37a and exit from this chamber is restricted by the needle valve 43 in such a manner that a predetermined pressure is maintained in this compartment. This pressure forces the plate 19 downward against the upper end of the valve stem 23 and compresses the compression spring 29 to open the valve 24. The pipe connection 21 carrying the valve 24 is attached to a source of supply of liquid fertilizer, at tank 51. When the valve 24 is open, liquid fertilizer flows around valve 24 into the lower distributor compartment and the fertilizer then flows out through the several distributor tubes 62, 63, 64, and 65. When the vehicle upon which this assembly is mounted is stopped, oil ceases to enter into the upper chamber through the line 37a and the needle valve 43 permits instant reduction of pressure with the result that compression spring 29 lifts the valve stem 23 to close the valve 24 to further inlet of fluid. The apparatus is thus closed to the further flow of liquid fertilizer. The apparatus of Figure 3 is relatively small and the actual volume of liquid fertilizer contained in the lower and distributing compartment is very, very small.

Referring now to Figures 1 and 2 of the drawing, there is illustrated a two-wheeled vehicle mounting my liquid distributor system. The liquid fertilizer, such as anhydrous ammonia, is stored in pressure tank 51. A liquid outlet line 66 conducts liquid from this pressure tank to the bottom of the distributor control element 11 around the valve 24, as shown in Figure 3. Manually operable valve 67 is shown in line 66 so that the liquid may be closed off at times when the apparatus is not in use, for example, during an overnight period. Element 52 is an oil reservoir which supplies oil to a pressure pump 53. Oil from the pump 53 flows through the line 37 into heat exchanger 121. This oil flows in contact with heat exchange coils 62c, 63c, 64c, and 65c in heat exchange with ammonia passing therethrough. The heat exchanged oil then leaves the exchanger through a pipe 37a into the top section of the distributor 11. Oil from this distributor returns through line 39 to the reservoir 52. The needle valve 43, as mentioned hereinbefore, is intended to throttle the flow of oil through tube 39 so as to provide oil pressure in the upper compartment of distributor 11. The oil pressure pump 53 is operated by a take-off assembly 54 which is operated by the axle 55 of the vehicle. This take-off assembly 54 is illustrated as being a belt driven assembly but it may be a gear driven assembly or other suitable power take-off means. Frame 57 is the framework assembly of this vehicle and upon this framework assembly is mounted the several parts of the distributor apparatus. Reference numeral 56 refers to the soil into which the ammonia fertilizer is to be injected. Elements 58, 59, 60 and 61 are shoes of more or less conventional type in the center of which are openings throughout their length. A flexible tube 62 connects the distributor apparatus 11 with the heat exchange coil 62c and this coil communicates with tube 62b which terminates at about the bottom end of the shoe 58 and is below the surface of the ground to be fertilized. The other tubes 63, 64, and 65 pass ammonia respectively to heat exchange coils 63c, 64c, and 65c, and the ammonia therefrom leaves the exchanger through tubes 63b, 64b, and 65b, respectively. These latter tubes extend respectively through shoes 59, 60 and 61 for passage of the ammonia into the soil.

While in Figure 5 all four tubes from the distributor 11 are connected with heat exchange coils, under some conditions it is not necessary to pass ammonia from all four of these tubes through the heat exchanger. In case it is desired not to employ heat exchange coils 62c and 64c, it is merely necessary then to close valves 122 and 124 and open valve 123 in a by-pass tube 62a, and to close valves 128 and 130 and to open valve 129 in a by-pass tube 64a. In this manner ammonia is by-passed from the heat exchanger and this by-passed ammonia is not utilized in cooling of the hydraulic oil. Valves 125 and 127 are provided in case it is desired to close off ammonia from tube 63 from flowing through the exchanger. In this case valve 126 in tube 63a is opened for by-passing the exchanger. In like manner valves 131 and 133 are closed to by-pass ammonia from the exchanger through tube 65a with valve 132 being open. Thus by regulating these valves, any number of the heat exchange coils can be used or not used as desired.

Under some conditions it is preferable to insulate the heat exchanger 121 and the hydraulic oil containing tubes and the oil reservoir to protect against atmospheric heat.

While I have illustrated one embodiment of heat exchanger 121, any other suitable type of heat exchanger, provided it is an indirect exchanger, can be used.

Figure 2 is a side elevational view of the assembly of Figure 1. This side elevation shows the particular positioning of the shoes 58, 59, 60, and 61 and of the corresponding tubes 62b, 63b, 64b, and 65b therein for introduction of ammonia into the soil 56. A hitch apparatus 81 is for connection of this vehicle to a tractor or other prime mover used for moving this apparatus. Element 82 is a conventional adjustment device the rotation fo which lowers the shoes into the ground further or raises them to a shallower depth, as desired.

In the apparatus as illustrated and described above, I have shown the assembly as a 4-tube injection assembly, that is, 4 rows may be fertilized during one passage of the apparatus. When introducing fertilizer between crop rows which are relatively close together, the apparatus may be provided with any desired number of distributor tubes. For example, there may be provided 12 or 16 flexible distributor tubes with corresponding shoes. When fertilizing a wheat field in which the rows of grain are relatively close together, such an apparatus containing 16 points of injection may be used. When fertilizing cotton or corn, a lesser number of injection points can be used in a vehicle of given width because the rows of such crops are planted farther apart than are wheat rows.

As mentioned above in the explanation of the operation of the distributor of Figure 1, when the vehicle stops, the pump 53 ceases to furnish oil under pressure to the diaphragm 18 and needle valve 43 permits bleed-off of pressure and the compression spring 29 closes the valve 24 and the loss of fertilizer is eliminated. In like manner, when the apparatus is started, fluid fertilizer does not pass valve 24 until oil pressure is built up against the diaphragm plate 19 sufficiently to open the valve 24.

In Figure 4 is shown another embodiment of my ammonia distributor apparatus. According to this figure, the housing or body consists of an upper body member 91, a lower body member 92 and a depending valve head housing or case 100. Disposed between the body members is a diaphragm 93, as shown. To the under side of the diaphragm is attached, as by means of a cotter key 106, a valve 104. The lower end 107 of the valve stem is tapered. On the large diameter end of this taper section 107 is a head 101 containing a resilient sealing member 102. Depending from the under side of the valve head is a guide rod 111. Surrounding this guide member 111 is a ring 110 of resilient material which, in turn, is surrounded by a metal ring 109. Holding this support assembly in its proper relation with respect to the guide rod 111 are some radially disposed arms 108. These arms 108 are attached to the inner walls of the case 100 by any means as desired, as by welding, etc. The case 100 may be attached to the lower body member 92 by threads 115. An O-ring seal 105 surrounds valve stem 104 to prevent or to minimize leakage of ammonia into the space in the lower housing 92 below the diaphragm 93. The bottom of the lower housing member 92 is so shaped as to serve as a seat 103 against which the resilient member 102 seats when the diaphragm and valve are raised by a compression spring 116 when fluid pressure is reduced in the space above the diaphragm 93.

Connected to the upper housing member 91 is a pair of pipe connections 95 and 97. To connection 95 is attached a tube 94 which is equivalent to tube 37a of Figure 3. To connection 97 is attached a tube 96 carrying a needle valve 98, which tube and valve are equivalent, respectively, to elements 39 and 43 of Figure 3. A pressure gauge 99 is for indication of oil pressure above the diaphragm.

Connections 117 and 118 are metering connections similar to elements 32 and 34 of Figure 3. To connections 117 and 118 are connected tubes 112 and 113, respectively, for passage of ammonia from this distributor apparatus to a heat exchanger, such as exchanger 121 of Figure 5. Connection 114 is for passage of ammonia from its storage tank to this distributor.

The operation of the apparatus of Figure 4, is in general, similar to the operation of the Figure 3 distributor. Oil, under pressure and cooled by a heat exchanger similar to exchanger 121, flows through tube 94 and connection 95 into the space above the diaphragm 93. Needle valve 98 in the outlet tube 96 is adjusted to hold a desired working pressure of oil upstream of this valve, as indicated by gauge 99. When the apparatus is not in operation, that is, when the vehicle is not traveling, there is no pressure above the diaphragm and the compression spring 116 operates to move the diaphragm 93 upward, with resultant closing of the valve 101.

When the vehicle is moving, some oil pressure is registered on the gauge 99, according to the adjustment of valve 98. With this valve adjustment maintained fixed, and the vehicle moving at a more rapid rate, a greater pressure is exerted on the diaphragm 93 with the result that the valve 101 is pushed downward farther. The taper section 107 of the valve is then intended to allow passage of more ammonia than when the valve (and taper section) is not depressed to such an extent by the diaphragm. Thus, it is seen that the taper section 107 is intended to throttle the flow of ammonia from its storage tank to this distributor, flow being less when the vehicle is moving at a slower rate.

An O-ring sealing member 105 is intended to prevent appreciable leakage of ammonia to the under side of the diaphragm. Since the oil above the diaphragm 93 is usually at a temperature above the boiling point of liquid ammonia, free access of the ammonia to the under side of the diaphragm is undesirable. It is preferred that the major portion of the ammonia be injected into the soil as liquid ammonia; and, consistent with this preference, there should be as little evaporation of ammonia in the distributor as possible.

The materials of construction of this apparatus may be selected from those commercially available, taking into account corrosive properties of the fluid fertilizer being handled. In case liquid ammonia is the liquid fertilizer used, ordinarily materials of commerce may be used since anhydrous ammonia is not generally corrosive.

While certain embodiments of the invention have been described for illustrative purposes, the invention obviously is not limited thereto.

I claim:

1. An implement-mounted dispensing system for the direct application of ammonia to soil comprising, in combination, a wheeled vehicle, a cultivator shoe attached to said vehicle, said shoe being adapted to produce a furrow in the ground as the vehicle is moved forward, a liquid ammonia supply tank supported by said vehicle, a normally closed diaphragm operated valve assembly having a fluid inlet and a fluid outlet and a flexible diaphragm, said inlet and outlet being on the same side of said diaphragm, a valve seat within said fluid inlet, a first conduit communicating said fluid inlet with said tank, a valve having a stem, and a head disposed in operable relation with respect to said seat, said diaphragm being attached to said stem for imparting movement to said valve, an indirect heat exchanger, said heat exchanger having a coolant inlet and outlet and an inlet for oil to be cooled and an outlet for cooled oil, a second conduit leading from the outlet of said valve assembly to the coolant inlet of said heat exchanger, a third conduit leading from the coolant outlet of said heat exchanger to said shoe for passage of ammonia to the soil, an oil storage reservoir and an oil pump mounted on said vehicle, a fourth conduit leading from said oil storage reservoir to the inlet of said pump, a fifth conduit leading from the outlet side of said pump to the oil inlet of said heat exchanger, a sixth conduit leading from the oil outlet of said heat exchanger to the diaphragm valve assembly on the side of the diaphragm opposite the valve, the diaphragm being adapted to open said valve upon sensing a predetermined oil pressure from said pump, a power take-off on said vehicle for operating said pump when said vehicle is moving in a forward direction, and an oil return conduit extending from the diaphragm valve assembly on the side of the diaphragm opposite said valve to the oil storage reservoir.

2. An implement-mounted dispensing system for the direct application of ammonia to soil comprising, in combination, a wheeled vehicle adapted to travel along the ground, a cultivator shoe attached to said vehicle, said shoe being adapted at its lower extremity to produce a furrow in the ground as the vehicle is moved forward, a liquid ammonia supply tank rigidly mounted on said vehicle, a normally closed diaphragm operated valve assembly having a flexible diaphragm, and a fluid inlet and a fluid outlet on the same side of said diaphragm, a valve seat within said fluid inlet, a first conduit communicating said fluid inlet with said ammonia supply tank, a valve having a head and a stem, said head being disposed in operable relation with respect to said seat within said fluid inlet and said stem being operably attached to said diaphragm for imparting movement to said valve head, an indirect heat exchanger, said heat exchanger having a coolant inlet and outlet and an inlet for oil to be cooled and an outlet for cooled oil, a second conduit leading from the outlet of said valve assembly to the coolant inlet of said heat exchanger, a third conduit leading from the coolant outlet of said heat exchanger to said shoe for passage of ammonia to the soil, an oil storage reservoir, an oil pump mounted on said vehicle, a fourth conduit leading from said oil storage reservoir to the inlet of said pump, a fifth conduit leading from the pressure outlet side of said pump to the oil inlet of said heat exchanger, a sixth conduit leading from the oil outlet of said heat exchanger to the diaphragm valve assembly on the side of the diaphragm opposite the valve stem, the diaphragm being adapted to open said valve upon sensing a predetermined oil pressure from said pump, a power take-off on said vehicle connected for operating said pump when said vehicle is moving in a forward direction, and an oil return conduit extending from the diaphragm valve assembly on the side of the diaphragm opposite said valve stem to the oil storage reservoir.

3. An implement-mounted dispensing system for the direct application of ammonia to soil comprising, in combination, a wheeled vehicle adapted to travel along the ground, a cultivator shoe attached to said vehicle, said shoe being adapted at its lower extremity to produce a furrow in the ground as the vehicle is moved forward, a liquid ammonia supply tank rigidly mounted on said vehicle, a normally closed diaphragm operated valve assembly having a flexible diaphragm, and a fluid inlet and a fluid outlet on the same side of said diaphragm, a valve seat in and concentric with said fluid inlet, a first conduit attached to said fluid inlet and leading from said ammonia supply tank, a valve having a head and a stem, said valve being disposed in operable relation with said seat, the stem of said valve being operatively attached to said diaphragm for imparting movement to the valve head, an indirect heat exchanger, said heat exchanger having a coolant inlet and outlet and an inlet for oil to be cooled and an outlet for cooled oil, a second conduit leading from the outlet of said valve assembly to the coolant inlet of said heat exchanger, a third conduit leading from the coolant outlet of said heat exchanger to said shoe for applying ammonia to the soil, said fluid outlet having an orifice therein, an oil reservoir, an oil pump mounted on said vehicle, a fourth conduit leading from the oil reservoir to the inlet of said pump, a fifth conduit leading from the pressure outlet of said pump to the oil inlet of said heat exchanger, a sixth conduit leading from the oil outlet of said heat exchanger to the diaphragm valve assembly on the side of the diaphragm opposite the valve stem, the diaphragm being adapted to open the valve upon sensing a predetermined oil pressure from said pump, a power take-off on said vehicle connected for operating said pump when said vehicle is moving in a forward direction, and an oil return conduit from the diaphragm valve assembly on the side of the diaphragm opposite said valve stem to the oil reservoir.

4. An implement-mounted dispensing system for the direct application of ammonia to soil comprising, in combination, a wheeled vehicle adapted to travel along the ground, a cultivator shoe attached to said vehicle, said shoe being adapted at its lower extremity to produce a furrow in the ground as the vehicle is moved forward, a liquid ammonia supply tank rigidly mounted on said vehicle, a normally closed diaphragm operated valve assembly having a housing and a fluid inlet and a fluid outlet at one end of said housing, a valve seat in said inlet, a first conduit attached to said fluid inlet leading from said ammonia supply tank, a valve having a head and a stem, said valve being disposed in operable relation with said seat, a plane and rigid partition disposed within said housing closer to the valve end than to the other end, the plane of said partition being normal to the axis of the stem of said valve, an opening in said partition, said valve stem extending through said opening, a packing gland assembly disposed in said opening and fixed in a rigid and fluid-tight manner to said partition and operatively around said valve stem, a flexible diaphragm in said housing normal to the axis of said valve stem on the side of said partition opposite the valve head, said valve stem being operatively connected to said diaphragm, an oil inlet and an oil outlet in the diaphragm end of said housing, an indirect heat exchanger, said heat exchanger having a coolant inlet and outlet and an inlet for oil to be cooled and an outlet for cooled oil, an oil containing reservoir and an oil pressure pump mounted on said vehicle, a second conduit leading from the reservoir to the inlet of said pump, a third conduit leading from the outlet of said pump to the oil inlet of said heat exchanger, a fourth conduit leading from the oil outlet of said heat exchanger to said oil in the diaphragm end of said housing, a fifth conduit leading from the oil outlet in the diaphragm end of said housing to said reservoir, a sixth conduit leading from said fluid outlet of said housing to the coolant inlet of said heat exchanger, a seventh conduit leading from the coolant outlet of said heat exchanger to said shoe for applying ammonia to the soil, a power take-off mounted on said vehicle, said power take-off being adapted to operate said oil pressure pump to open said valve when the vehicle is moving in a forward direction.

5. A dispensing system for the direct application of ammonia to soil comprising, in combination, a wheeled vehicle, a shoe supported by said vehicle, said shoe being adapted to produce a furrow in the ground as the vehicle is moved forward, a liquid ammonia storage tank mounted on said vehicle, a normally closed diaphragm operated valve assembly having a flexible diaphragm and a separate inlet and a separate outlet on each side of said diaphragm, a valve seat in the inlet on one side of said diaphragm, a first conduit communicating said tank with the last mentioned inlet, a valve having a head and a stem disposed in operable relation with respect to said seat, said stem being operably attached to said diaphragm, an indirect heat exchanger, said heat exchanger having a coolant inlet and outlet and an inlet for oil to be cooled and an outlet for cooled oil, an oil storage reservoir and an oil pump mounted on said vehicle, a second conduit communicating said reservoir with the inlet of said pump, a third conduit communicating the outlet of said pump with the exchanger inlet for oil to be cooled, a fourth conduit communicating the cooled oil outlet of said exchanger with the inlet on the other side of said diaphragm, a fifth conduit communicating the outlet on said other side of said diaphragm with said reservoir, a sixth conduit communicating the outlet on said one side of said diaphragm with the coolant inlet of said exchanger, a seventh conduit communicating the coolant outlet of said exchanger with a point near the bottom of said shoe, and a power take-off mounted on said vehicle, said power take-off being operatively attached to said pump to operate same to open said valve as said vehicle moves forward.

6. In the dispensing system of claim 5, a pressure regulating valve disposed operably in said fifth conduit.

7. In the dispensing system of claim 4, a pressure regulating valve disposed operably in said fifth conduit.

References Cited in the file of this patent

UNITED STATES PATENTS 2,691,358     Peck _____ Oct. 12, 1954

FOREIGN PATENTS 1,153,074     France _____ Sept. 23, 1957

UNITED STATES PATENT OFFICE
CERTIFICATE OF CORRECTION

Patent No. 2,973,729

March 7, 1961

Alvin W. Peck

It is hereby certified that error appears in the above numbered patent requiring correction and that the said Letters Patent should read as corrected below.

Column 8, line 21, after "oil" insert -- inlet --.

Signed and sealed this 10th day of October 1961.

(SEAL)
Attest:

ERNEST W. SWIDER
Attesting Officer

DAVID L. LADD
Commissioner of Patents
USCOMM-DC